Patented Apr. 20, 1926.

1,581,641

UNITED STATES PATENT OFFICE.

ERICH KRAUSE, OF CONSTANCE, GERMANY, ASSIGNOR, BY MESNE ASSIGNMENTS, TO THE ROESSLER & HASSLACHER CHEMICAL COMPANY, OF NEW YORK, N. Y., A CORPORATION OF NEW YORK.

OXIDATION OF ETHYL ALCOHOL TO ACETALDEHYDE.

No Drawing. Application filed June 4, 1924. Serial No. 717,893.

*To all whom it may concern:*

Be it known that I, ERICH KRAUSE, a citizen of Germany, residing at Constance, Badenia, Germany, have invented certain new and useful Improvements in the Oxidation of Ethyl Alcohol to Acetaldehyde, of which the following is a specification.

This invention relates to the production of acetaldehyde.

It is known that ethyl alcohol can be converted into acetaldehyde by oxidation. This reaction may be effected either in the liquid "phase", for instance by treating ethyl alcohol with oxidizers such as bichromate and sulphuric acid, thus getting maximum yields of 70 to 72% or it may be effected in the gaseous "phase" at a higher temperature in the presence of contact substances such as for instance platinum black, vanadium pentoxide, freshly reduced copper-wire gauze, etc. When copper-wire gauze is used as the contact substance, yields of about 66% are obtained.

According to the present invention, the oxidization of ethyl alcohol to acetaldehyde is effected in the presence of silver in the form of wire gauze as the contact substance.

In carrying the invention into effect ethyl alcohol vapour in admixture with oxygen (which is preferably used in the form of gases containing oxygen such as air) is passed at a high temperature over the wire gauze, for instance in such a manner that the contact substance has a scarcely visible incandescence. The process, when once started, continues without further supply of heat. The yields are practically equal to the theoretical yields.

Example.

Through a quartz tube of 18 mm. diameter charged for a length of 60 mm. with silver wire discs piled upon one another, about 20 grams of alcohol of 90 per cent strength (by weight) in the form of vapor, and 25 litres of air are passed per hour. The process is started by a short period of heating, whereupon the reaction continues without the further supply of heat from an external source. The resulting acetaldehyde is recovered in the known manner or washed out of the reaction gases. The yield is 92.3 per cent of the theoretical.

Instead of pure or aqueous ethyl alcohol, mixtures or solutions containing ethyl alcohol may be used, provided they do not contain disturbing concomitants which can be readily ascertained by preliminary tests.

The very favorable action of silver could not have been foreseen in any way. On the contrary, the ease with which acetaldehyde is altered, would have led one to expect undesirable reactions, such, for instance, as the formation of higher oxidation-products, decomposition products and the like. For instance it is to be noted that according to the British Patent 178,842, by passing acetaldehyde and air over silver at temperatures of 450° C., considerable quantities of formaldehyde are produced.

Having now described my invention what I claim as new and desire to secure by Letters Patent is:—

1. A process for producing acetaldehyde which comprises passing ethyl alcohol and oxidizing gases over a silver catalyst.

2. A process for producing acetaldehyde which comprises passing ethyl alcohol and oxidizing gases over a filamentous silver catalyst.

3. A process for producing acetaldehyde which comprises passing ethyl alcohol and oxidizing gases over a heated silver catalyst.

4. A process for producing acetaldehyde which comprises passing ethyl alcohol and oxidizing gases over a silver catalyst heated to slight incandescence.

5. A process for producing acetaldehyde which comprises passing ethyl alcohol and air over a silver catalyst.

6. A process for producing acetaldehyde which comprises passing ethyl alcohol and air over a heated silver catalyst.

In testimony whereof I affix my signature.

ERICH KRAUSE.